United States Patent
Guo et al.

(10) Patent No.: US 9,690,135 B2
(45) Date of Patent: Jun. 27, 2017

(54) LIQUID CRYSTAL DISPLAY PANEL, DISPLAY DEVICE AND PROCESS FOR PATTERNING QUANTUM DOT LAYER

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN); Chuncheng Che, Beijing (CN); Jianyun Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/352,022

(22) Filed: Nov. 15, 2016

(65) Prior Publication Data

US 2017/0059902 A1 Mar. 2, 2017

Related U.S. Application Data (62) Division of application No. 14/355,112, filed as application No. PCT/CN2013/080065 on Jul. 25, 2013.

(30) Foreign Application Priority Data

Apr. 9, 2013 (CN) .......................... 2013 1 0121557

(51) Int. Cl.
*G02F 1/1335* (2006.01)
*G02F 1/1343* (2006.01)
*B05D 1/00* (2006.01)

(52) U.S. Cl.
CPC ........... *G02F 1/1336* (2013.01); *B05D 1/005* (2013.01); *G02F 1/133514* (2013.01);
(Continued)

(58) Field of Classification Search
CPC ............. G02F 1/1336; G02F 1/133514; G02F 1/134309; G02F 2001/133614; G02F 2001/134345; G02F 2202/36; B05D 1/005

See application file for complete search history.

(56) References Cited

U.S. PATENT DOCUMENTS 6,816,222 B2 11/2004 Ono et al.
2010/0060822 A1 3/2010 Sun
(Continued)

FOREIGN PATENT DOCUMENTS

| CN | 101034225 A | 9/2007 |
| CN | 100504543 C | 6/2009 |
| CN | 102944943 A | 2/2013 |

OTHER PUBLICATIONS

International Search Report mailed Jan. 16, 2014; PCT/CN2013/080065.
(Continued)

*Primary Examiner* — Mary Ellen Bowman
(74) *Attorney, Agent, or Firm* — Ladas & Parry LLP (57) ABSTRACT

A liquid crystal display panel, in which pixel units are provided on the liquid crystal display panel, each pixel unit includes sub-pixel units displaying different colors, at a position of the apposed substrate or the array substrate corresponding to the sub-pixel unit of at least one color in each pixel unit, a monochromatic quantum dot layer is disposed. This liquid crystal display panel has increased color gamut of the liquid crystal display panel, enhanced color saturation, increased display quality, and increased life (Continued)

of quantum dots. A display device and a process for patterning the monochromatic quantum dot layer are also provided.

15 Claims, 11 Drawing Sheets

(52) U.S. Cl.
CPC ............... *G02F 1/134309* (2013.01); *G02F 2001/133614* (2013.01); *G02F 2001/134345* (2013.01); *G02F 2202/36* (2013.01)

(56) References Cited

U.S. PATENT DOCUMENTS

2011/0281388 A1  11/2011  Gough et al.
2014/0132890 A1  5/2014  Zhang
2014/0168576 A1  6/2014  Lee

OTHER PUBLICATIONS

Chinese Patent Certificate issue date Dec. 9, 2015; ZL 2013 1 012557.6.
International Preliminary Report on Patentability issued Oct. 13, 2015; PCT/CN2013/080065.
First Chinese Office Action dated Jan. 19, 2015; Appln. No. 201310121557.6.
USPTO RR dated Oct. 5, 2015 in connection with U.S. Appl. No. 14/355,112.
USPTO NFOA dated Jan. 15, 2016 in connection with U.S. Appl. No. 14/355,112.
USPTO FOA dated May 4, 2016 in connection with U.S. Appl. No. 14/355,112.
USPTO NOA mailed Aug. 22, 2016 in connection with U.S. Appl. No. 14/355,112.

A mixture comprising a monochromatic quantum dots, a phenolic resin derivative, a diazonaphthol derivative and a photoinitiator is coated on a substrate — S601

The phenolic resin derivative and the diazonaphthol derivative in the designated region can be polymerized under the action of a photoinitiator to generate a macromolecular polymer network with quantum dots evenly dispersed within the macromolecular polymer network — S602

Development is conducted on the substrate which has been illuminated by the UV light using the development solution of tetramethylammonium hydroxide — S603

LIQUID CRYSTAL DISPLAY PANEL, DISPLAY DEVICE AND PROCESS FOR PATTERNING QUANTUM DOT LAYER

TECHNICAL FIELD

Embodiments of the invention relates to a liquid crystal display panel, a display device, and a process for patterning a quantum dot layer.

BACKGROUND

Quantum dots (QDs) can also be called nanocrystals, and are nanoparticles consisting of II-VI family or III-V family elements. The particle sizes of quantum dots are generally between 1nm-20 nm. Because electrons and holes are confined by quantum, the structure of continuous energy bands is converted into the structure of discrete energy bands, and thus quantum dots may emit fluorescence after excitation.

The emission spectra of quantum dots can be controlled by altering the sizes of the quantum dots. By altering the sizes and chemical compositions of quantum dots, their emission spectra can be made to cover the whole visible region. Using CdTe quantum dots as an example, when the particle sizes grow from 2.5 nm to 4.0 nm, the emission wavelength can make a red shift from 510 nm to 660 nm.

Currently, the light emitting property of quantum dots can be utilized so as to employ quantum dots as molecular probes in fluorescent labeling. They can also be used in a display device. Where monochromatic quantum dots are used as the light source of the backlight module of a liquid crystal display panel, after excited by a blue light emitted by LED, the monochromatic quantum dots emit monochromatic light which mixes with the blue light to form white background light, which has large light gamut and can improve the graphic quality. However, in the prior art, there has been no design to apply the quantum dots within the liquid crystal display panel.

SUMMARY

Embodiments of the invention provide a process for patterning a liquid crystal display panel, a display device and a quantum dot layer for improving the gamut of the display panel, thereby improving the graphic quality.

An aspect of the invention provides a liquid crystal display panel comprising an apposed substrate, an array substrate as well as a liquid crystal layer positioned between the apposed substrate and the array substrate; in which pixel units are provided with in the liquid crystal display panel, each pixel unit comprises sub-pixel units displaying different colors, and at a position of the apposed substrate or the array substrate corresponding to the sub-pixel unit of at least one color in each pixel unit, a monochromatic quantum dot layer is disposed; and the monochromatic quantum dot layer, upon being excited by background light, emits monochromatic light corresponding to the color of the sub-pixel unit Another aspect of the invention provides a display device comprising the liquid crystal display panel provided by an embodiment of the invention.

A further aspect of the invention provides a process for patterning a quantum dot layer comprising coating a mixture comprising monochromatic quantum dots, a phenolic resin derivative, a diazonaphthol derivative as well as a photoinitiator on a substrate; and allowing UV light to illuminate on the substrate through the unit of the mask plate which polymerizes the phenolic resin derivative and the diazonaphthol derivative under action of the photoinitiator to generate a macromolecular polymer network, wherein the monochromatic quantum dots are evenly dispersed within the macromolecular polymer network.

DESCRIPTION OF DRAWINGS

Specific embodiments of the process for patterning the liquid crystal display panel, display device and quantum dot layer provided by an embodiment of the invention are illustrated in details below in relation to the drawings, wherein.

DETAILED DESCRIPTION

Specific embodiments of the process for patterning the liquid crystal display panel, display device and quantum dot layer provided by an embodiment of the invention are illustrated in details below in relation to the drawings, so as to allow a person of ordinary skill to more clearly and completely understand the invention.

The thickness of each film and the shape of the regions in the figures do not reflect the real aspect of the array substrate or the apposed substrate, but aiming instead to exemplify the invention.

Unless defined otherwise, any technical or scientific terms used herein have the usual meaning understood by a person of ordinary skill in the relevant art. The "first", "second" and the like used in the description and claims of the present patent application do not indicate any order, number or significance, but merely distinguish different components. Similarly, terms such as "a", "an" or "the" do not intend to define the number, but to indicate the presence of at least one. Terms such as "comprise", "include" or the like mean that the element or object preceding the term encompasses the element(s) or object(s) and equivalent(s) thereof enumerated following the term, without excluding other element or object. Terms such as "link" or "connect" or the like are not limited to physical or mechanical connection, but also encompass electrical connection, no matter directly or indirectly. "Above", "under", "left", "right" and the like are merely used to indicate relative spatial relations. When the absolute position of the object described changes, these relative spatial relations may change accordingly.

Figure 1A:
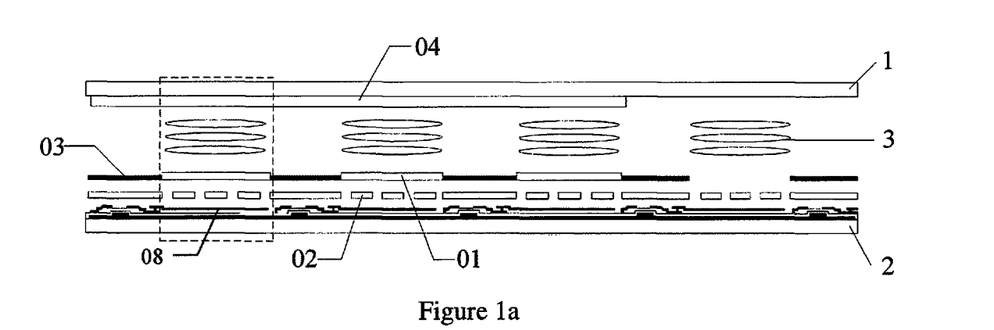
FIG. 1a and FIG. 1b are each the structural diagram of the liquid crystal display panel according to an embodiment of the invention.
Figure 1B:
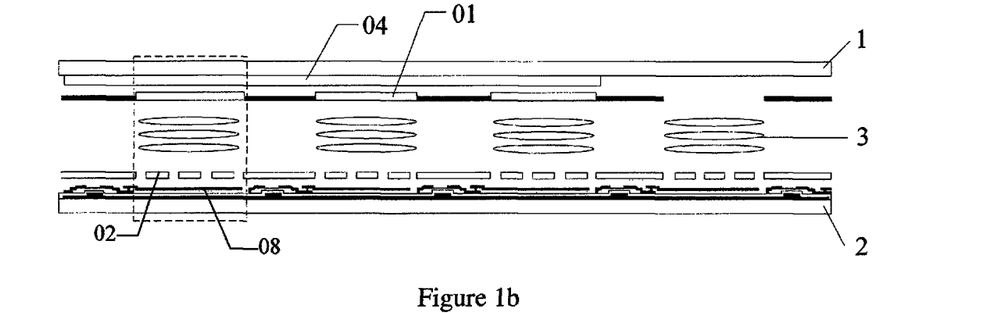

An embodiment of the invention provides a liquid crystal display panel, as illustrated in FIG. 1a and FIG. 1b, comprising an apposed substrate 1, an array substrate 2, as well as a liquid crystal layer 3 positioned between the apposed substrate 1 and the array substrate 2. Pixel units are provided on the array substrate 2, that is, pixel units are provided within the liquid crystal display panel, and these pixel units are arranged into an array. Each pixel unit has sub-pixel units displaying different colors (each sub-pixel unit is as illustrated in the dashed box in the figure).

In this liquid crystal display panel, at a position of the apposed substrate or the array substrate corresponding to the sub-pixel unit of at least one color in each pixel unit, a monochromatic quantum dot layer 01 is disposed; and the monochromatic quantum dot layer 01, upon being excited by background light, emits monochromatic light corresponding to the color of the sub-pixel unit.

The monochromatic quantum dot layer comprises a macromolecular polymer network as well as monochromatic quantum dots evenly dispersed within the macromolecular polymer network, for example, the monochromatic quantum dot layer consists of a macromolecular polymer network as well as monochromatic quantum dots evenly dispersed within the macromolecular polymer network. The macromolecular polymer network is generated by polymerization of the mixture of a phenolic resin derivative and a diazonaphthol derivative via UV light illumination under the action of a photoinitiator.

Figure 2:
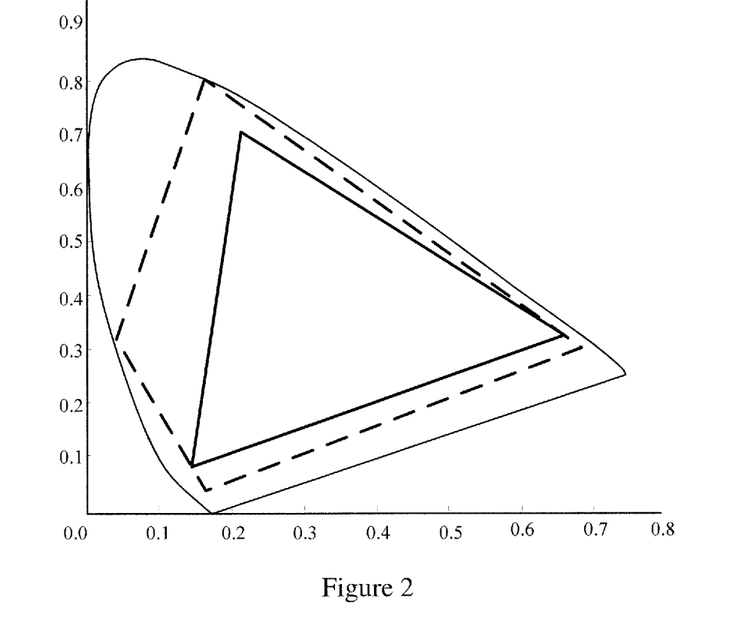
FIG. 2 is a diagram simulating the color gamut of the liquid crystal display panel provided by an embodiment of the invention and existing liquid crystal display panel.

In the liquid crystal display panel provided by the embodiment of the invention, a monochromatic quantum dot layer is employed to replace the existing colored resin as the colored filter to convert the background light into monochromatic light; the deflecting of the liquid crystal molecules in the liquid crystal layer is controlled by the electric filed generated between the pixel electrode in the sub-pixel unit and the common electrode to adjust the intensity of the light (gray scale) of the sub-pixel unit, so as to achieve color liquid crystal display. Because the quantum dots have narrow emission spectra and high light emitting efficiency, they can convert the background light into monochromatic light with high efficiency. In the embodiment of the invention, as illustrated in the FIG. 2 in which gamut is simulated, because each monochromatic quantum dot layer emits monochromatic light of different colors, with combinations of red light, yellow light, green light, cyan light and blue light for example, the gamut curve can reach the edge of the gamut (as indicated by dashed line in the figure). As compared to the gamut curve composed of the traditional three primary colors of red, green and blue (indicated by solid line in FIG. 2), because of the addition of other pure color, such as the aforesaid yellow, in the embodiment of the invention, the range of the gamut can be increased. Moreover, as long as QD are modulated to a certain size, they are able to emit yellow light. Because QD emit light with a narrower half peak width, purer light can be obtained. Therefore, the area formed at the four corners of the gamut in the invention is enlarged. That is, QD light emitting is illustrated to result in a larger gamut. By way of the aforesaid, the invention can increase the color gamut of the liquid crystal display panel, enhance the color saturation, and thus improve the display quality of the display panel.

Generation of the macromolecular polymer network by UV illumination of a mixture of a phenolic resin derivative and a diazonaphthol derivative allows monochromatic quantum dots to be evenly dispersed in the macromolecular polymer network, to pattern the quantum dot layer, prevent the quantum dots from aggregation, and increase the quantum yield of the quantum dots, so as to increase the optical efficiency of the quantum excitation. Moreover, the macromolecular polymer network can shield air from monochromatic quantum dots, avoiding the contact between the monochromatic quantum dots with oxygen so as to increase the life of quantum dots.

For example, the liquid crystal display panel provided by an embodiment of the invention is applicable to modes. For example, it can be applied to In-Plane Switch (IPS) and Advanced Super Dimension Switch (ADS) liquid crystal display panel, which can achieve wide visual angle property. It may also be applied to conventional Twisted Nematic (TN) liquid crystal display panel or Vertical Alignment (VA) liquid crystal display panel, and the like. These modes of liquid crystal display panels are merely examples and no limitation is intended herein.

The following liquid crystal display panels provided by an embodiment of the invention are illustrated by taking an ADS liquid crystal display panel as an example.

According to one embodiment, a monochromatic quantum dot layer 01 disposed within each sub-pixel unit, for example, can be disposed on the side of the array substrate 2 facing the liquid crystal layer 3. For example, the array substrate 2 as illustrated in FIG. 1a has a common electrode 02, and the monochromatic quantum dot layer 01 is disposed above the common electrode 02. This common electrode 02 can be positioned above the pixel electrode 08 of the array substrate 2 as illustrated in FIG. 1a, or under the pixel electrode 08 in another embodiment, or the common electrode 02 is disposed on the same layer as the pixel electrode 08 in a further embodiment. The monochromatic quantum dot layer 01 can be disposed above the common electrode 02 and the pixel electrode 08 of the array substrate 2, and the monochromatic quantum dot layer 01 is insulated from the common electrode 02 and pixel electrode 08. Of course, according to the embodiments of the invention and the requirements in the manufacturing processes, each the monochromatic quantum dot layer 01 can be disposed on the side of the array substrate 2 away from the liquid crystal layer 3 (for example, under the array substrate 2 in FIG. 1a), or each the monochromatic quantum dot layer 01 is disposed between other film layers in the array substrate 2. The present invention is not limited thereto. The background light from under the array substrate 2 first illuminates on each monochromatic quantum dot layer 01 positioned at the sub-pixel unit, the quantum dots in each monochromatic quantum dot layer 01 are excited by the background light to generate the corresponding monochromatic light, and then each monochromatic light is regulated by the liquid crystal layer controlled by the electric field generated between the common electrode 02 and the pixel electrode 08 so that the light intensity of each monochromatic light is changed to achieve color liquid crystal display.

Moreover, where each monochromatic quantum dot layer 01 is disposed on the array substrate 2, a black matrix 03 can be disposed on the same layer as all the monochromatic quantum dot layers 01, as illustrated in FIG. 1a, that is, both the black matrix 03 and the monochromatic quantum dot layers 01 are disposed on the array substrate 2. Of course, the black matrix 03 can be disposed on the side of the apposed substrate 1 facing the liquid crystal layer 3. The present invention is not limited thereto.

According to one embodiment, the monochromatic quantum dot layer 01 disposed within each sub-pixel unit, for example, can also been disposed on the side of the apposed substrate 1 facing the liquid crystal layer 3 as illustrated in FIG. 1b. The background light from under the array substrate 2 is first regulated by the liquid crystal layer controlled by the electric field generated between the common electrode 02 and the pixel electrode 08, and then illuminates on each monochromatic quantum dot layer 01 positioned at the sub-pixel unit, and the quantum dots in each monochromatic quantum dot layer 01 are excited by the background light to produce the corresponding monochromatic light so as to achieve color liquid crystal display.

In the liquid crystal display panel provided by an embodiment of the invention, there is also provided a backlight module on the side of the array substrate away from the liquid crystal layer (such as under the array substrate 2 in FIGS. 1a and 1b). For example, the background light emitted by the backlight module is blue light which has a central wavelength of preferably about 450 nm, so as to enable the monochromatic quantum dots in each monochromatic quantum dot layer to produce corresponding monochromatic light upon being excited. Of course, based on the excitation wavelength of the quantum dots which are actually chosen, for example, near ultraviolet light can also be chosen as the background light for exciting the quantum dots. The present invention is not limited thereto. The backlight module may, for example, be a side illumination backlight module or a direct illumination backlight module. The light source employed is, for example, a light emitting diode or the like.

Where blue light is chosen as the background light to excite each monochromatic quantum dot layer, in order to prevent blue background light from further passing through the sub-pixel unit after absorption by each monochromatic quantum dot layer, resulting in the lack of purity of the monochromatic light emitted from the sub-pixel unit, an absorption layer 04 for absorbing blue light can be disposed on the monochromatic quantum dot layer 01 corresponding to each sub-pixel unit disposed with a monochromatic quantum dot layer 01, and correspondingly, the absorption layer 04 is not disposed at the position of sub-pixel units emitting blue light. For example, as illustrated in FIG. 1a and FIG. 1b, the absorption layer 04 may be disposed on the side of the apposed substrate 1 facing the liquid crystal layer 3. Moreover, the disposed absorption layer 04 can also shield the external blue light illuminated from the side of the apposed substrate 1 away from the liquid crystal layer 3 and entering the liquid crystal display panel, so as to prevent the external blue light from exciting the quantum dots in the monochromatic quantum dot layer, which excitation make it hard to control the intensity of the monochromatic light emitting from the sub-pixel unit and affecting the liquid crystal display quality.

According to one embodiment of the invention, the material for the absorption layer 04 comprises 5-(1-methyl-2-pyrrolylmethyl)rhodanine or derivatives thereof.

For example, as illustrated in FIG. 1a and FIG. 1b, where blue light is chosen as the background light to excite each monochromatic quantum dot layer 01, blue light can also been directly used as a primary color light for the pixel unit. That is, if each pixel unit has sub-pixel units respectively displaying N different colors, wherein sub-pixel units respectively displaying N-1 colors are disposed with monochromatic quantum dot layers respectively, then one sub-pixel unit is not disposed with the monochromatic quantum dot layer (thereby formed as a passing-through hole). The blue light serving as the background light passes through the sub-pixel unit directly, and the blue light whose intensity has been modulated by the liquid crystal layer is emitted out, where N is an integer greater than or equal to 2. Fore example, where N is 2, the display colors of the two sub-pixel units constituting one pixel unit are complementary to each other, for example, orange and blue, respectively.

Figure 3A:
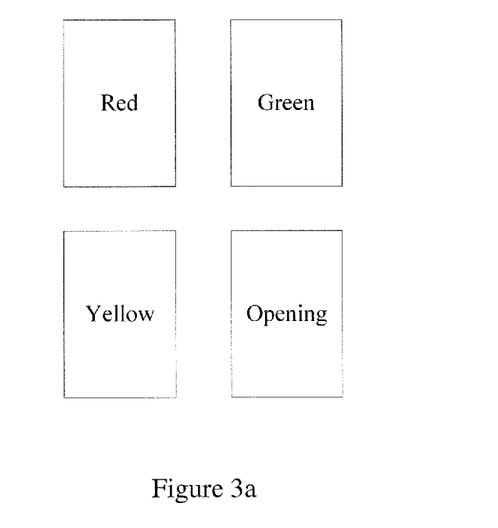
FIG. 3a-FIG. 3d are diagrams showing the arrangement of the sub-pixel units in the pixel unit according to an embodiment of the invention.
Figure 3B:
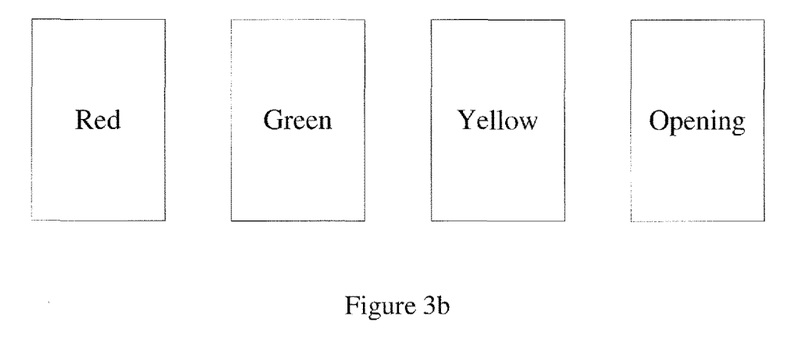
Figure 3C:
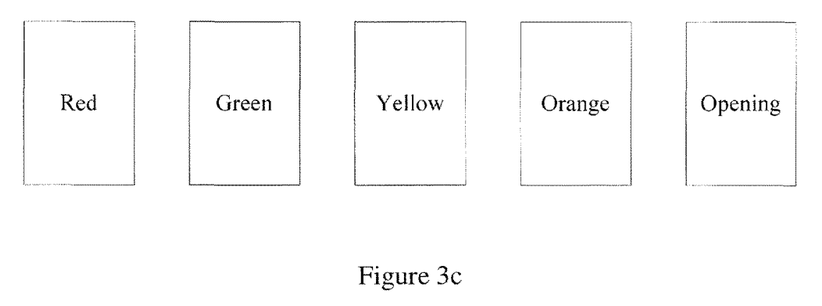
Figure 3D:
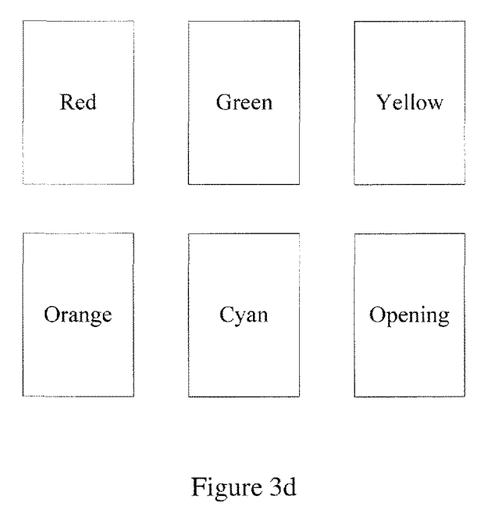

According to an embodiment of the invention, one pixel unit can have 4, 5, or 6 colors, and the present invention is not limited thereto. For example, where one pixel unit is composed of four colors of blue, red, green and yellow, each pixel unit has four sub-pixel units which can be arranged and combined as illustrated in FIG. 3a or in FIG. 3b, and the present invention is not limited thereto. In the configuration of FIGS. 3a and 3b, one sub-pixel unit is not disposed with a monochromatic quantum dot layer, through which the background blue light passes directly, that is, in an opening structure. The other 3 sub-pixel units are disposed with a monochromatic quantum dot layer emitting red light, a monochromatic quantum dot layer emitting green light, and a monochromatic quantum dot layer emitting yellow light, respectively. Further for example, where one pixel unit is composed of five colors of blue, red, green, yellow, and orange, each pixel unit has 5 sub-pixel units which can be arranged and combined as illustrated in FIG. 3c, in which one sub-pixel unit is not disposed with a monochromatic quantum dot layer, through which the background blue light passes directly, that is, in a opening structure. The other 4 sub-pixel units are disposed with a monochromatic quantum dot layer emitting red light, a monochromatic quantum dot layer emitting green light, a monochromatic quantum dot layer emitting yellow light, and a monochromatic quantum dot layer emitting orange light, respectively. Still further for example, where one pixel unit is composed of 6 colors of blue, red, green, yellow, orange, and cyan, each pixel unit has 6 sub-pixel units which can be arranged and combined as illustrated in FIG. 3d, in which one sub-pixel unit is not disposed with a monochromatic quantum dot layer, through which the background blue light passes directly, that is, a opening structure. The other 5 sub-pixel units are disposed with a monochromatic quantum dot layer emitting red light, a monochromatic quantum dot layer emitting green light, a monochromatic quantum dot layer emitting yellow light, a monochromatic quantum dot layer emitting orange light, and a monochromatic quantum dot layer emitting cyan light, respectively. The arrangement of sub-pixel units in each pixel unit is not limited to those illustrated in FIGS. 3a-3d. For example, the sub-pixel units on the upper and lower rows can be arranged in a staggered manner.

A monochromatic quantum dot layer that emits red light, green light, yellow light, orange light or cyan light upon being excited by background light can be selected. The light emitting wave bands can be controlled by controlling the particle sizes of the quantum dots. Taking ZnS quantum dots as an example, the quantum dots that emits red light have size substantially at about 9 ~10 nm, the quantum dots that emits yellow light have size substantially at about 8 nm, and the quantum dots that emits green light have size substantially at about 7 nm.

It should be noted that the monochromatic quantum dot layer of an embodiment of the invention means that the quantum dots disposed at the positions of the array substrate or the apposed substrate corresponding to the sub-pixel units of the same color are the same, and the quantum dots disposed at the positions of the array substrate or the apposed substrate corresponding to the sub-pixel units of different colors are different. Here, "different" can be referred to difference in size or material of the quantum dots, as long as it is ensured that the quantum dots at sub-pixel units corresponding to all the colors only emit monochromatic light corresponding to the colors of the sub-pixel units upon excitation. That is to say, quantum dots in all the regions of the monochromatic quantum dot layer can emit monochromatic light only upon excitation, but the sub-pixel unit regions corresponding to different colors emit different monochromatic light.

Figure 4A:
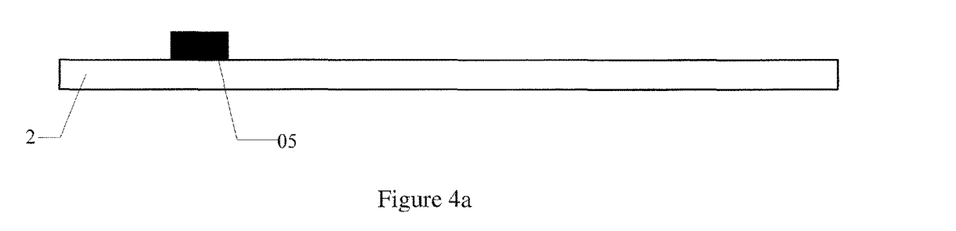
FIG. 4a-FIG. 4k are diagrams showing the steps of the preparation of the array substrate according to an embodiment of the invention.
Figure 4B:
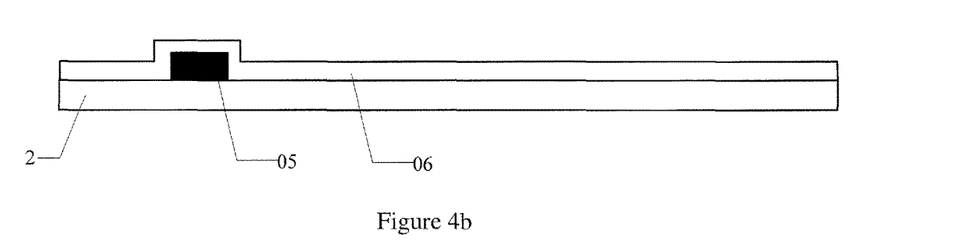
Figure 4C:
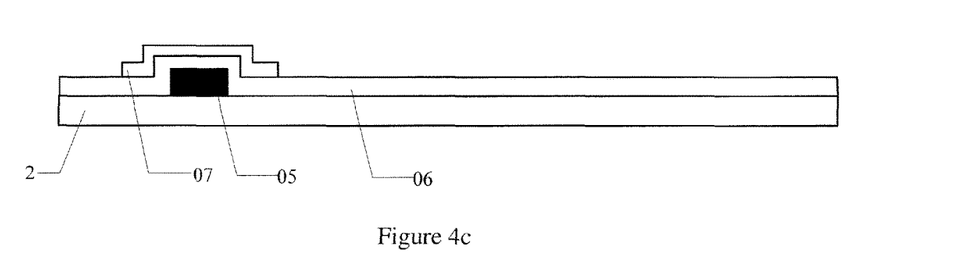
Figure 4D:
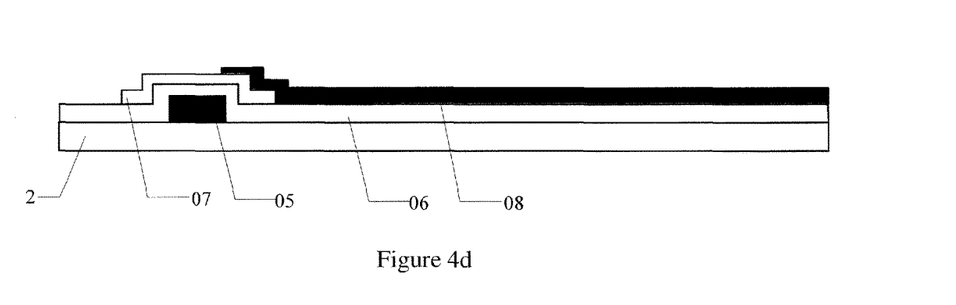
Figure 4E:
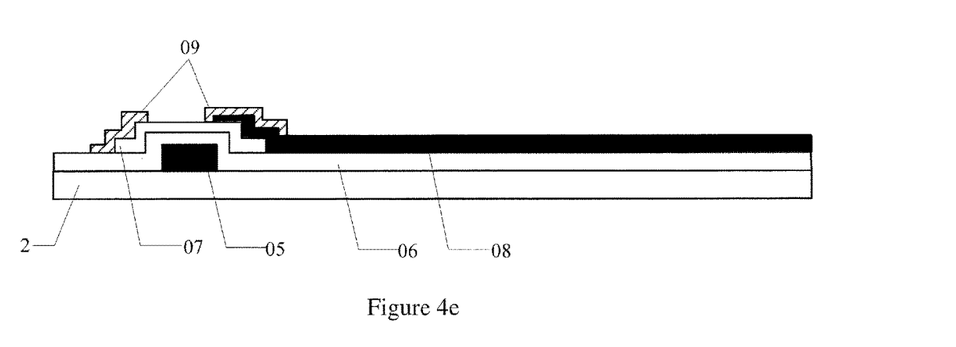
Figure 4F:
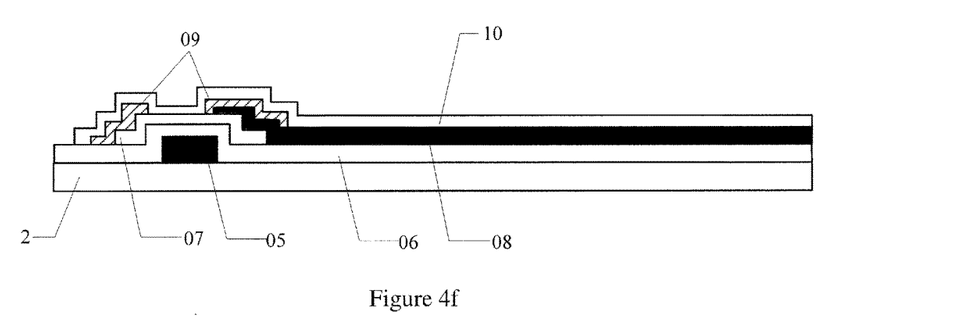
Figure 4G:
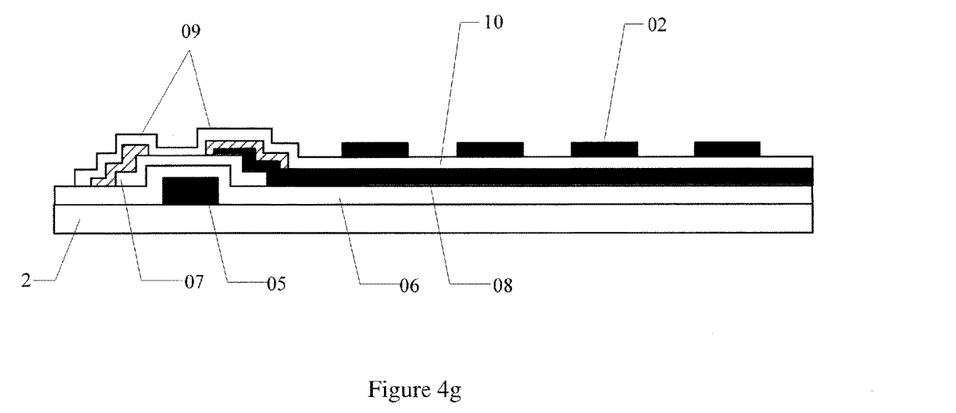
Figure 4H:
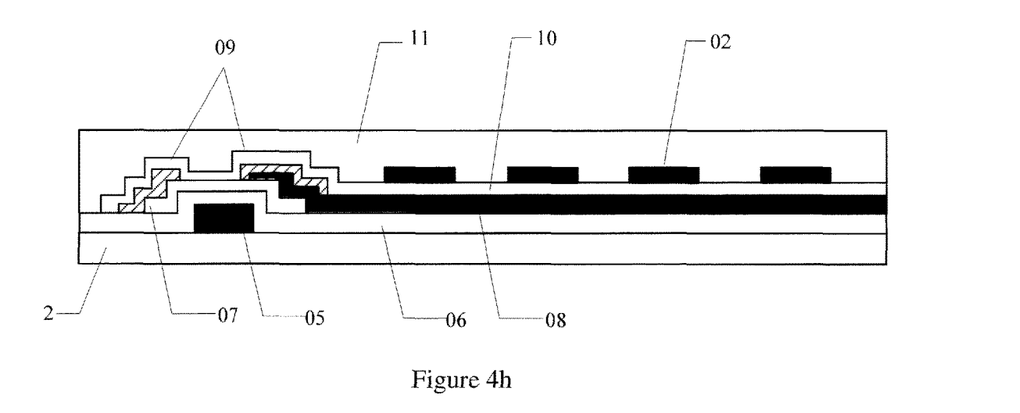
Figure 4I:
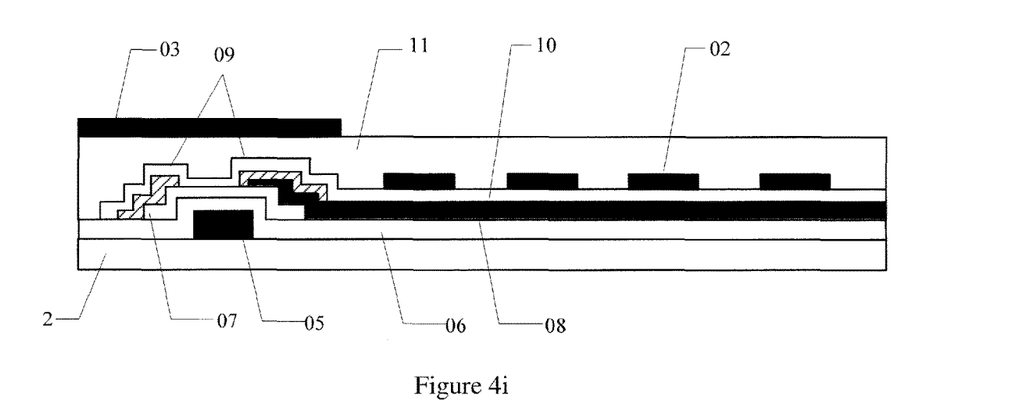
Figure 4J:
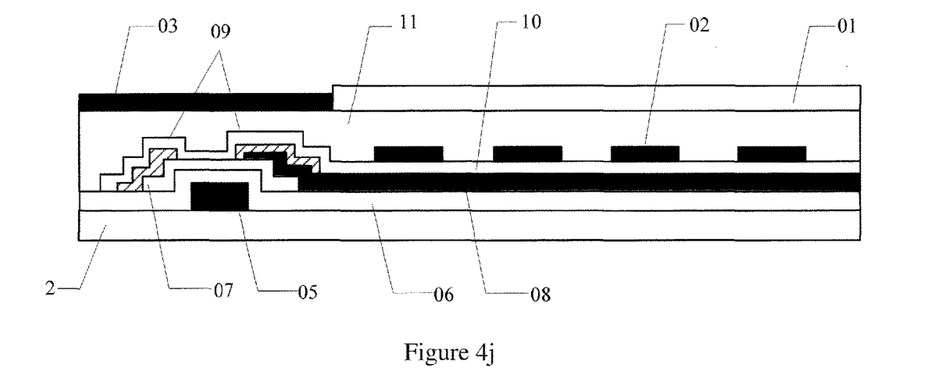
Figure 4K:
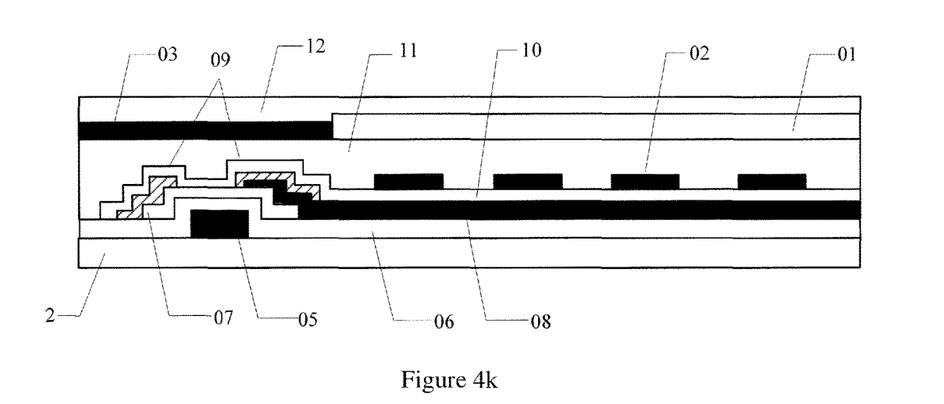

According to one embodiment, taking the liquid crystal display panel in which each monochromatic quantum dot layer is disposed on the array substrate as an example, the process for manufacturing the array substrate may comprise the following steps as illustrated in FIG. 4a-FIG. 4k:

(1) forming a gate electrode 05 on the array substrate 2 as illustrated in FIG. 4a;
(2) forming a gate insulation layer 06 on the gate electrode 05 as illustrated in FIG. 4b;
(3) forming an active layer 07 on the gate insulation layer 06 as illustrated in FIG. 4c;
(4) forming a layer of pixel electrode 08 above the active layer 07 and the gate insulation layer 06, wherein the pixel electrode 08 is a plate electrode, as illustrated in FIG. 4d;
(5) forming source-drain electrodes 09 (comprising a source electrode and a drain electrode opposite to each other) above the pixel electrode 08 and the active layer 07, respectively, as illustrated in FIG. 4e;
(6) depositing a first insulation (PVX) layer 10 on the source-drain electrodes 09 and the pixel electrode 08, as illustrated in FIG. 4f;
(7) forming a strip-shaped common electrode 02, which forms silts between its electrode strips, on the first insulation (PVX) layer 10, as illustrated in FIG. 4g;
(8) forming a second insulation (PVX) layer 11 on the common electrode 02, as illustrated in FIG. 4h;
(9) forming a black matrix 03 on the second insulation (PVX) layer 11, which for example covers the formed thin film transistor, gate line and data line, as illustrated in FIG. 4i;
(10) preparing a monochromatic quantum dot layer 01, which faces and is on the pixel electrode 08 and the common electrode 02, on the second insulation (PVX) layer 11, as illustrated in FIGS. 4j; and
(11) forming a first protection layer 12 on the black matrix 03 and the monochromatic quantum dot layer 01, as illustrated in FIG. 4k.

In the aforesaid embodiment, the thin film transistor formed of the gate electrode 05, the gate insulation layer 06, the active layer 07 as well as the source-drain electrodes 09 is a bottom gate type thin film transistor. However, the invention is not limited thereto. For example, in another embodiment, a top gate type thin film transistor can be formed. In the aforesaid embodiments, the common electrode 02 is located above the pixel electrode 08. As described above, in other embodiments, the common electrode 02 and the pixel electrode 08 may be disposed in other manners and the invention is not thus limited. Where a certain sub-pixel unit does not need the formation of the monochromatic quantum dot layer 01, then the monochromatic quantum dot layer 01 is not formed at the corresponding position, resulting in an opening structure.

Figure 5A:
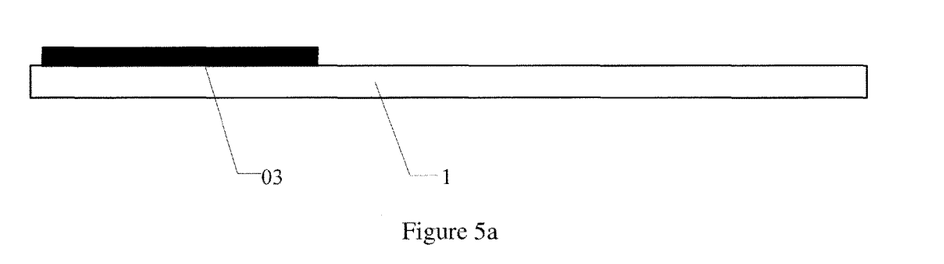
FIG. 5a-FIG. 5e are diagrams showing the steps of the preparation of the apposed substrate according to an embodiment of the invention.
Figure 5B:
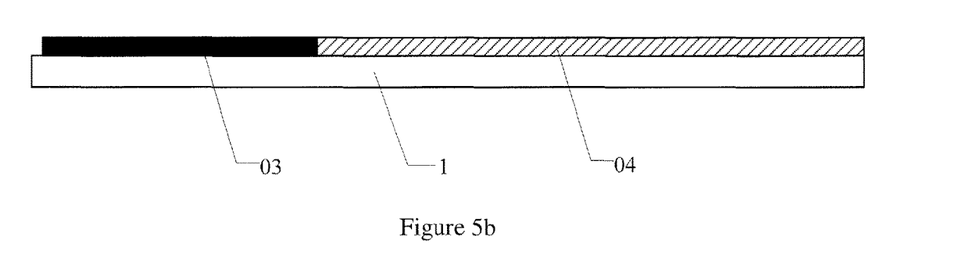
Figure 5C:
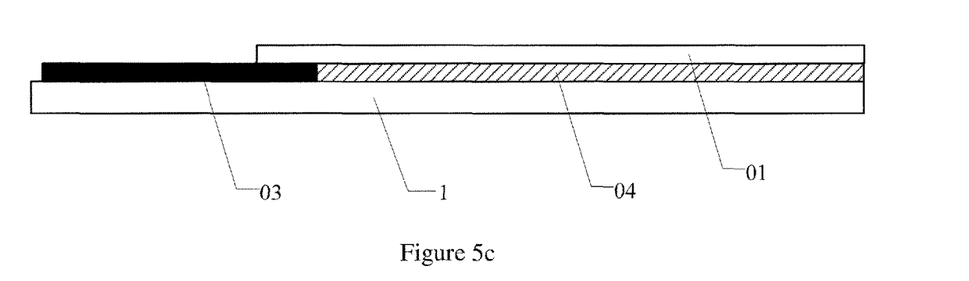
Figure 5D:
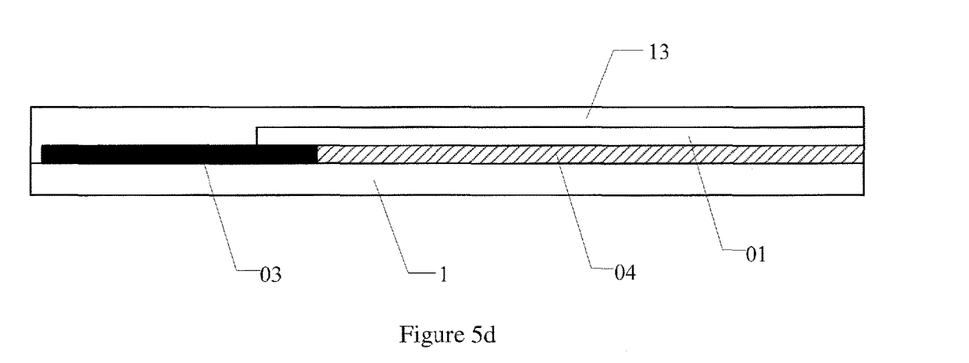

Accordingly, taking the liquid crystal display panel in which each monochromatic quantum dot layer is disposed on the apposed substrate as an example, the process for manufacturing the apposed substrate may comprise the following steps as illustrated in FIG. 5a-FIG. 5e:

(1) forming a region of black matrix 03 (BM) on the apposed substrate 1, wherein a pixel region is exposed through the black matrix 03, as illustrated in FIG. 5a;
(2) forming an absorption layer 04 which covers the pixel region exposed by the black matrix 03, as illustrated in FIG. 5b;
(3) preparing a monochromatic quantum dot layer 01 on the absorption layer 04, as illustrated in FIGS. 5c; and
(4) forming a second protection layer 13 on the monochromatic quantum dot layer 01, as illustrated in FIG. 5d.

Figure 5E:
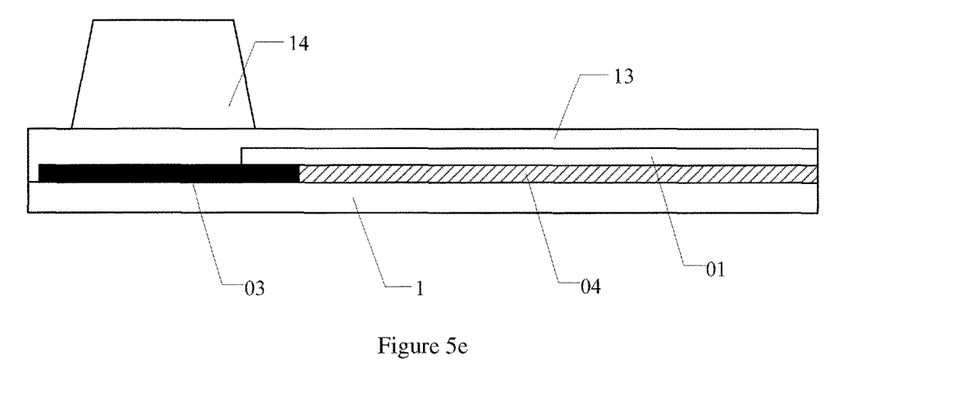

As desired, a post spacer (PS) layer 14 may further be formed on the second protection layer 13, as illustrated in FIG. 5e. Where the absorption layer 04 is formed, it may be made to cover the black matrix 03. For example, if each pixel unit comprises a sub-pixel unit emitting blue light and the absorption layer 04 is used for absorbing the blue light, then the absorption layer 04 is not disposed at the position corresponding to the sub-pixel unit that emits blue light. The pixel region exposed through the black matrix 03 corresponds to the sub-pixel unit on the array substrate used in combination with the apposed substrate. Where the monochromatic quantum dot layer 01 is not required to be formed for a certain sub-pixel unit, the monochromatic quantum dot layer 01 is not formed at the corresponding position, resulting in an opening structure. The array substrate used in combination with the apposed substrate in the embodiment can be of any available mode.

Where a monochromatic quantum dot layer is manufactured in the aforesaid manufacturing process, in order to avoid the quenching that can be caused by the aggregation of monochromatic quantum dots, which leads to issues of decreased quantum yield, an embodiment of the invention provides a liquid crystal display panel, in which each monochromatic quantum dot layer comprises a macromolecular polymer network as well as monochromatic quantum dots evenly dispersed within the macromolecular polymer network, so as to solve the problem caused by quantum dot aggregation. For example, the macromolecular polymer network is produced by polymerization of a mixture of a phenolic resin derivative and a diazonaphthol derivative upon UV illumination under the action of a photoinitiator.

Figure 6:
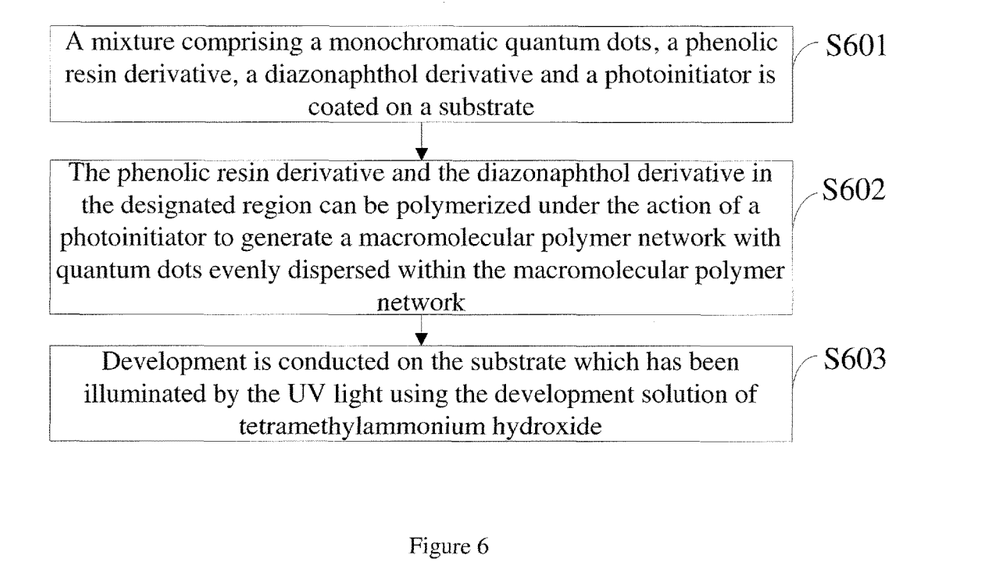
FIG. 6 is a diagram showing the flow chart of a process for patterning the monochromatic quantum dot layer according to an embodiment of the invention.

An embodiment of the invention further provides a process for patterning a quantum dot layer comprising the following steps as illustrated in FIG. 6:

Step S601, a mixture comprising a monochromatic quantum dots, a phenolic resin derivative, a diazonaphthol derivative and a photoinitiator is coated on a substrate; the substrate can be a glass substrate, a quartz substrate, a plastic substrate, or the like.

In an embodiment, the step S601 can be implemented as follows:

(1) The monochromatic quantum dots (designated as 1 in FIG. 7), a phenolic resin derivative, a diazonaphthol derivative, an organic solvent such as propylene glycol monomethyl ether acetate, and a photoinitiator are mixed to provide a mixed solution. For example, the monochromatic quantum dots, the phenolic resin derivative, the diazonaphthol derivative, the propylene glycol monomethyl ether acetate, and the photoinitiator can be mixed and mechanically agitated for 1 hour, followed by ultrasonic dispersion, resulting in the product 2 in FIG. 7.
(2) The mixed solution is spin coated on the substrate as FIG. 8a.
(3) The organic solvent propylene glycol monomethyl ether acetate in the mixed solution is removed, for example, by vacuum pumping (as illustrated by 3 in FIG. 7), resulting in a mixture comprising the monochromatic quantum dots, the phenolic resin derivative, the diazonaphthol derivative and the photoinitiator and coated on the substrate, as illustrated in FIG. 8b.

In an example, the monochromatic quantum dots account for less than about 1% by weight, the phenolic resin derivative accounts for about 15%-30% by weight, the organic solvent propylene glycol monomethyl ether acetate accounts for about 50%-70% by weight, and the photoinitiator accounts for about 2%-10% by weight.

For example, the material for the monochromatic quantum dots may be selected from materials of Family II-VI such as CdS, CdSe, CdTe, ZnO, ZnSe, and ZnTe and Family III-V such as GaAs, GaP, GaAs, GaSb, HgS, HgSe, HgTe, InAs, InP, InSb, AlAs, AlP, AlSb and the like.

For example, the photoinitiator may be any one of benzoyl peroxide, lauroyl peroxide, azodiisobutyronitrile, azodiisoheptonitrile, diisopropyl peroxydicarbonate and dicyclohexyl peroxydicarbonate, or combinations thereof.

For example, the molecular structural formula of the phenolic resin derivative can be as illustrated below :

where a=1-100, b=1-100, c=1-30, n=10-300.

For example, the molecular structural formula of the diazonaphthol derivative can be as illustrated below :

where R=—CnH2n+1, n=1-10.

Figure 7:
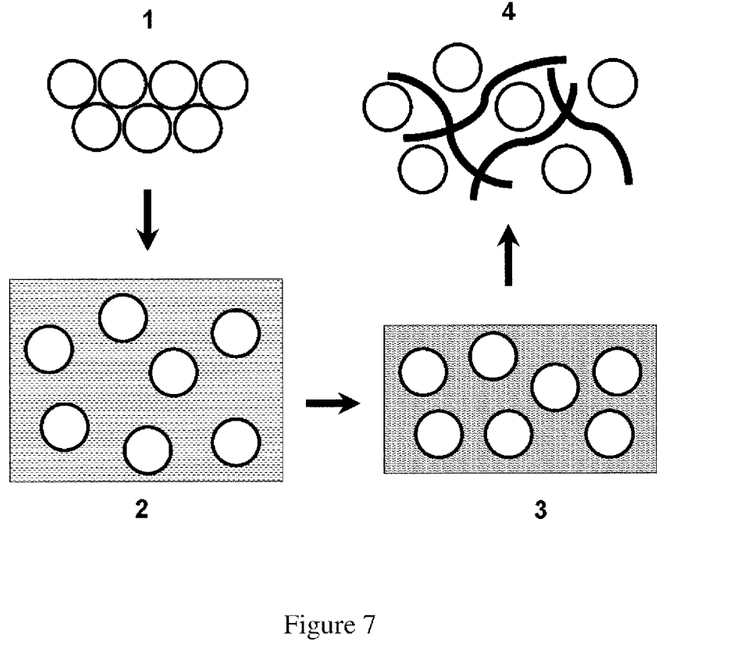
FIG. 7 is a diagram showing the dispersion of the quantum dots according to an embodiment of the invention in the macromolecular polymer network.
Figure 8A:
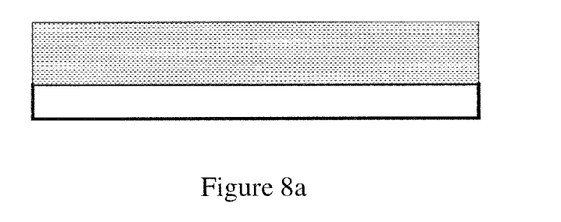
FIG. 8a-FIG. 8f are diagrams showing the steps of a process for patterning the monochromatic quantum dot layer according to an embodiment of the invention.
Figure 8B:
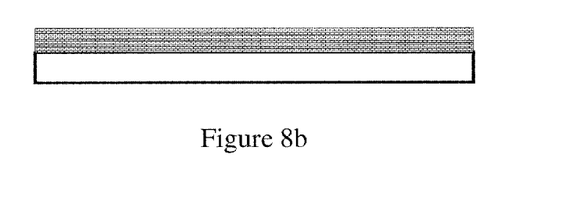
Figure 8C:
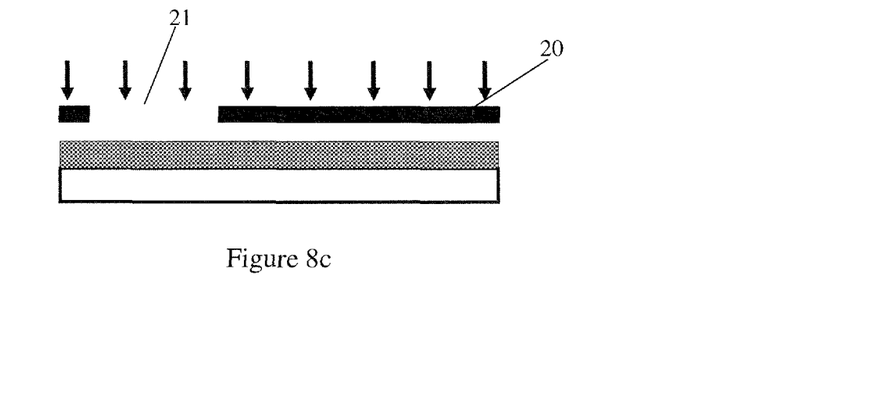

Step S602, the phenolic resin derivative and the diazonaphthol derivative in the designated region can be polymerized under the action of a photoinitiator to generate a macromolecular polymer network with quantum dots evenly dispersed within the macromolecular polymer network (as illustrated by 4 in FIG. 7). For example, the UV light passes through the transparent region 21 of the mask plate 20 to illuminate on the substrate, causing the phenolic resin derivative and the diazonaphthol derivative in the designated region to be polymerized under the action of the photoinitiator, as illustrated in FIG. 8c.

Figure 8D:
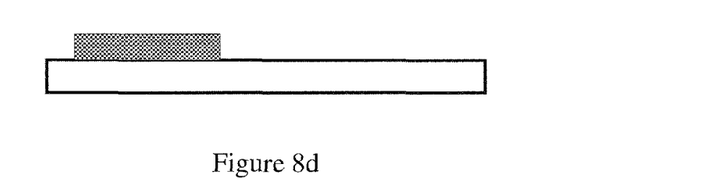

Here, the process of the epoxy resin polymerization of the phenolic resin derivative and the diazonaphthol derivative is as follows:

Further, after the generation of the macromolecular polymer network, the following steps may be included:

Step S603, development is conducted on the substrate which has been illuminated by the UV light using the development solution of tetramethylammonium hydroxide, followed by washing away the mixture not subjected to UV light illumination, as illustrated in FIG. 8d.

Figure 8E:
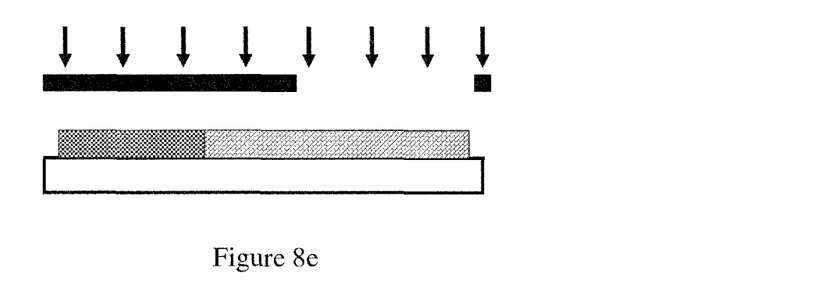
Figure 8F:
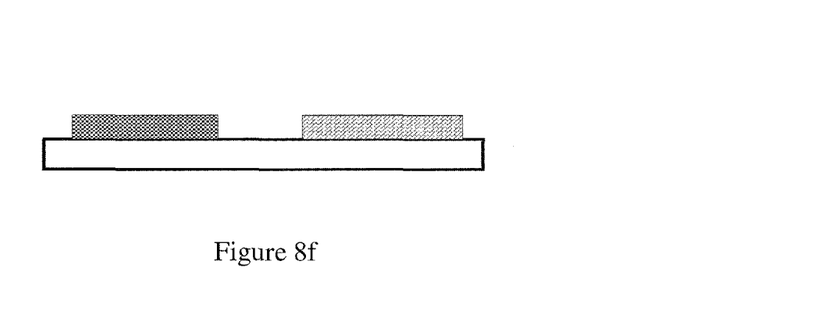

For example, the chemical mechanism of the development is as follows:

After the pattern of the monochromatic quantum dot layer prepared for a sub-pixel unit after the aforesaid step S601~S603, these steps can be repeated as illustrated in FIG. 8e and FIG. 8f to prepare the monochromatic quantum dot layer for other sub-pixel units. The detailed process is not repeated here.

By way of the aforesaid process for manufacturing the quantum dot layer provided by an embodiment of the invention, the quantum dot layer can be patterned on a substrate. Dispersion of the monochromatic quantum dots in a macromolecular polymer network can prevent the quantum dots from aggregating, and increase the quantum yield of the quantum dots, so as to increase the optical efficiency of the quantum excitation. Moreover, the macromolecular polymer network can shield air from monochromatic quantum dots, avoiding the contact between the monochromatic quantum dots with oxygen so as to increase the life of quantum dots.

An embodiment of the invention further provides a display device comprising the aforesaid liquid crystal display panel provided by an embodiment of the invention. Because the device solves the problem in a mechanism similar to the aforesaid liquid crystal display panel, the implementation of the device can be conducted with reference to the implementation of the panel, and will not be redundantly repeated here.

The invention provides a liquid crystal display panel, a display device and a process for patterning a quantum dot layer, in which pixel units are provided within the liquid crystal display panel, each pixel unit having sub-pixel units displaying different colors, and at the position of the apposed substrate or the array substrate corresponding to the sub-pixel unit of at least one color in each pixel unit, a monochromatic quantum dot layer is provided; and the monochromatic quantum dot layer, upon being excited by background light, emits monochromatic light corresponding to the color of the sub-pixel unit. In an embodiment of the invention, a quantum dot layer is employed to replace the existing colored resin as the colored filter to convert the background light into monochromatic light, and because the quantum dots have narrow emission spectra and high light emitting efficiency, they can convert the background light into monochromatic light at high efficiency, expand the color gamut of the liquid crystal display panel, enhance the color saturation, and thus improve the display quality of the display panel. Moreover, generation of a macromolecular polymer network by UV illumination of a mixture of a phenolic resin derivative and a diazonaphthol derivative allows the monochromatic quantum dots to be evenly dispersed in the macromolecular polymer network, and allows the patterning of the quantum dot layer, which can prevent the quantum dots from aggregation, increasing the quantum yield of the quantum dots, so as to increase the optical of the efficiency quantum excitation. Moreover, the macromolecular polymer network can shield air from monochromatic quantum dots, avoiding the contact between the monochromatic quantum dots with oxygen so as to increase the life of quantum dots.

It is apparent that a person skilled in the art can make modifications and variants of the invention without departing from the spirits and scope of the invention. The invention also is intended to encompass these modifications and variants and any equivalent thereof within the scope of the claims of the invention.

The invention claimed is:

1. A process for patterning a quantum dot layer comprising:
    coating a mixture comprising monochromatic quantum dots, a phenolic resin derivative, a diazonaphthol derivative and a photoinitiator on a substrate; and
    polymerizing the phenolic resin derivative and the diazonaphthol derivative in designated regions under action of a photoinitiator to generate a macromolecular polymer network with quantum dots evenly dispersed within the macromolecular polymer network.

2. The process according to claim 1, wherein coating of a mixture comprising monochromatic quantum dots, a phenolic resin derivative, a diazonaphthol derivative and a photoinitiator on a substrate comprises:

mixing the monochromatic quantum dots, the phenolic resin derivative, the diazonaphthol derivative, the organic solvent, and the photoinitiator to provide a mixed solution;

spin coating the mixed solution on the substrate; and removing the organic solvent in the mixed solution through a vacuum pumping process, resulting in a mixture comprising the monochromatic quantum dots, the phenolic resin derivative, the diazonaphthol derivative and the photoinitiator and coated on the substrate.

3. The process according to claim 1, wherein the organic solvent is propylene glycol monomethyl ether acetate.

4. The process according to claim 2, wherein the organic solvent is propylene glycol monomethyl ether acetate.

5. The process according to claim 1, wherein the monochromatic quantum dots account for less than about 1% by weight, the phenolic resin derivative accounts for about 15%-30% by weight, propylene glycol monomethyl ether acetate accounts for about 50%-70% by weight, and the photoinitiator accounts for about 2%-10% by weight.

6. The process according to claim 2, wherein the monochromatic quantum dots account for less than about 1% by weight, the phenolic resin derivative accounts for about 15%-30% by weight, propylene glycol monomethyl ether acetate accounts for about 50%-70% by weight, and the photoinitiator accounts for about 2%-10% by weight.

7. The process according to claim 3, wherein the monochromatic quantum dots account for less than about 1% by weight, the phenolic resin derivative accounts for about 15%-30% by weight, propylene glycol monomethyl ether acetate accounts for about 50%-70% by weight, and the photoinitiator accounts for about 2%-10% by weight.

8. The process according to claim 4, wherein the monochromatic quantum dots account for less than about 1% by weight, the phenolic resin derivative accounts for about 15%-30% by weight, propylene glycol monomethyl ether acetate accounts for about 50%-70% by weight, and the photoinitiator accounts for about 2%-10% by weight.

9. The process according to claim 1, wherein a material for the monochromatic quantum dots is CdS, CdSe, CdTe, ZnO, ZnSe, ZnTe, GaAs, GaP, GaAs, GaSb, HgS, HgSe, HgTe, InAs, InP, InSb, AlAs, AlP or AlSb.

10. The process according to claim 2, wherein a material for the monochromatic quantum dots is CdS, CdSe, CdTe, ZnO, ZnSe, ZnTe, GaAs, GaP, GaAs, GaSb, HgS, HgSe, HgTe, InAs, InP, InSb, AlAs, AlP or AlSb.

11. The process according to claim 1, wherein the photoinitiator is one or more of benzoyl peroxide, lauroyl peroxide, azodiisobutyronitrile, azodiisoheptonitrile, diisopropyl peroxydicarbonate and dicyclohexyl peroxydicarbonate, or combinations thereof.

12. The process according to claim 2, wherein the photoinitiator is one or more of benzoyl peroxide, lauroyl peroxide, azodiisobutyronitrile, azodiisoheptonitrile, diisopropyl peroxydicarbonate and dicyclohexyl peroxydicarbonate, or combinations thereof.

13. The process according to claim 1, further comprising developing the substrate which has been illuminated by the UV light with tetramethylammonium hydroxide aqueous solution after generating a macromolecular polymer network.

14. The, process according to claim 2, further comprising developing the substrate which has been illuminated by the UV light with tetramethylammonium hydroxide aqueous solution after generating a macromolecular polymer network.

15. The process according to claim 1, wherein UV light is allowed to pass through a transparent region of a mask plate to illuminate onto the substrate, causing the phenolic resin derivative and the diazonaphthol derivative in a designated region to be polymerized under action of a photoinitiator.

* * * * *